(12) United States Patent
Ishida

(10) Patent No.: US 6,261,079 B1
(45) Date of Patent: Jul. 17, 2001

(54) SCREEN EXCHANGING DEVICE

(75) Inventor: Yasuhiko Ishida, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 09/451,764

(22) Filed: Dec. 1, 1999

(30) Foreign Application Priority Data

Dec. 2, 1998 (JP) ................................................. 10-342430

(51) Int. Cl.$^7$ ................................................. B29C 47/68
(52) U.S. Cl. ........................ 425/197; 425/199; 210/484; 210/485; 210/497.3
(58) Field of Search ................................. 425/197, 199, 425/198; 210/477, 484, 485, 497.01, 497.3

(56) References Cited

U.S. PATENT DOCUMENTS

| 2,763,374 | 9/1956 | Corbett et al. ............... | 210/152 |
| 4,332,541 | * 6/1982 | Anders ........................... | 425/197 |
| 4,361,489 | * 11/1982 | Kilsdonk et al. .............. | 425/197 |
| 4,453,905 | * 6/1984 | Bennett ......................... | 425/197 |
| 5,125,823 | 6/1992 | Kreyenborg .................. | 425/185 |
| 5,151,025 | * 9/1992 | Muller .......................... | 425/199 |
| 5,449,458 | 9/1995 | Gneuss .......................... | 210/330 |

FOREIGN PATENT DOCUMENTS

| 29 47 698 | 6/1981 | (DE) | ................................. B29F/3/04 |
| 7-299310 | 11/1995 | (JP) | ................................. B01D/29/31 |

OTHER PUBLICATIONS

Patent Abstracts of Japan vol. 009, No. 162 (M–394), Jul. 6, 1985 & JP 60 036122 A (Nippon Seikosho KK) Feb. 25, 1985 *Abstract.

* cited by examiner

*Primary Examiner*—Nam Nguyen
*Assistant Examiner*—Thu Khanh T. Nguyen
(74) *Attorney, Agent, or Firm*—Sughrue, Mion, Zinn, Macpeak & Seas, PLLC

(57) ABSTRACT

At a distal end of a slide bar 4 which is axially slidably inserted in a through hole 1a of a housing 1 is formed a cylindrical filter chamber 7. The filter chamber 7 has a communicating hole 6 communicating with an inlet 3 provided in the housing 1 and a concave 5 formed at an outer peripheral face thereof except an area adjacent to the communicating hole 6 and communicating with an inlet 2 provided in the housing 1. The concave 5 is provided with a plurality of fitting holes 11 extending from the outer peripheral face toward an axis core of the filter chamber and spaced in circumferential and axial directions with respect to one another. Into each of the fitting holes 11 is inserted a screen cartridge 8 which consists of a breaker plate of a perforated plate in a form of a bottomed conical tube and a net member in a form of a bottomed conical tube.

4 Claims, 5 Drawing Sheets

SCREEN EXCHANGING DEVICE

BACKGROUND OF INVENTION

1. Field of Invention

This invention relates to a screen exchanging device in a plasticizing apparatus to be used in an extrusion molding machine, an injection molding machine, etc.

2. Related Art

One example of a screen exchanging device in the conventional extrusion molding machine will be explained hereunder.

As shown in FIG. 6, the screen exchanging device of the conventional type includes a housing 100 having a through hole 102, a blind flange 106 detachably provided at one end of the housing 100, a slide bar 105 slidably inserted in the through hole 102 in an axial direction from the other end of the housing 100. In a filter chamber 107 formed between a distal end face of the slide bar 105 and the blind flange 106, is arranged filter means 108 which will be described below. On opposite side walls of the housing 100, are respectively formed an inlet 103 and an outlet 104 which communicate with each other.

The filter means 108 consists of a container plate 109 in a form of a perforated plate and fixed to the distal end of the slide bar 105, and a plurality of cylindrical screen pack cartridges 108a detachably attached to the container plate 109 at a face thereof opposite to the slide bar side. The screen pack cartridge 108a is composed of a cylindrical breaker plate and a screen net which covers an outer peripheral wall thereof.

In this screen exchanging device, a molten resin flowing from the inlet 103 into the filter chamber 107 is filtered through a plurality of the screen pack cartridges 108a to remove foreign objects, and then flows through the perforated container plate 109 to be discharged from the outlet 104. When the foreign objects are accumulated and a loss in pressure has exceeded the determined value, the screen pack cartridges 108a will be exchanged. On this occasion, after removing the blind flange 106 of the housing 100, a hydraulic cylinder 111 is actuated to project its rod 111a in order to push the slide bar 105, thereby to cause the distal end of the slide bar 105 to project from the one end of the housing 100, thus allowing the screen pack cartridges 108a to be exchanged with new ones (JP-A-7-299310).

According to the above described conventional art, because the cylindrical screen pack cartridges are arranged on one face of the container plate, only a limited number of the screen pack cartridges can be arranged, and when exchanging the screen, it takes a lot of time and efforts to attach and detach the screen pack cartridges to and from the container plate. Moreover, since the filtered foreign objects are accumulated in the filter chamber, there has been an additional problem that the foreign objects accumulated in the filter chamber must be removed at the same time.

SUMMARY OF INVENTION

The present invention has been made in view of the above described problems that the prior art has encountered, and its object is to realize a screen exchanging device which can eliminate annoying works in exchanging the screen and is free from a fear that the foreign objects may be accumulated in the filter chamber.

In order to achieve the above described object, the screen exchanging device according to the present invention comprises a housing having a through hole, a slide bar axially slidably inserted in the through hole, a cylindrical filter chamber formed in a distal end of the slide bar, and an inlet and an outlet provided in opposite side walls of the housing respectively, said screen exchanging device being so constructed that a molten resin which has entered through the inlet is filtered in the filter chamber and flows out through the outlet, characterized in that the filter chamber includes a communicating hole communicating with the outlet and a concave formed at an outer peripheral face thereof except an area adjacent to the communicating hole, the concave being provided with a plurality of fitting holes extending from the outer peripheral face toward an axis core of the filter chamber, and spaced in circumferential and axial directions with respect to one another, into each of the fitting holes being detachably fitted a screen cartridge which consists of a breaker plate of a perforated plate in a form of a bottomed conical tube and a net member in a form of a bottomed conical tube inserted into the breaker plate.

Moreover, the net member inserted into the breaker plate can be so constructed that it can be attached and detached to and from the breaker plate.

DETAILED DESCRIPTION OF PREFERRED EMBODIMENTS

Figure 1:
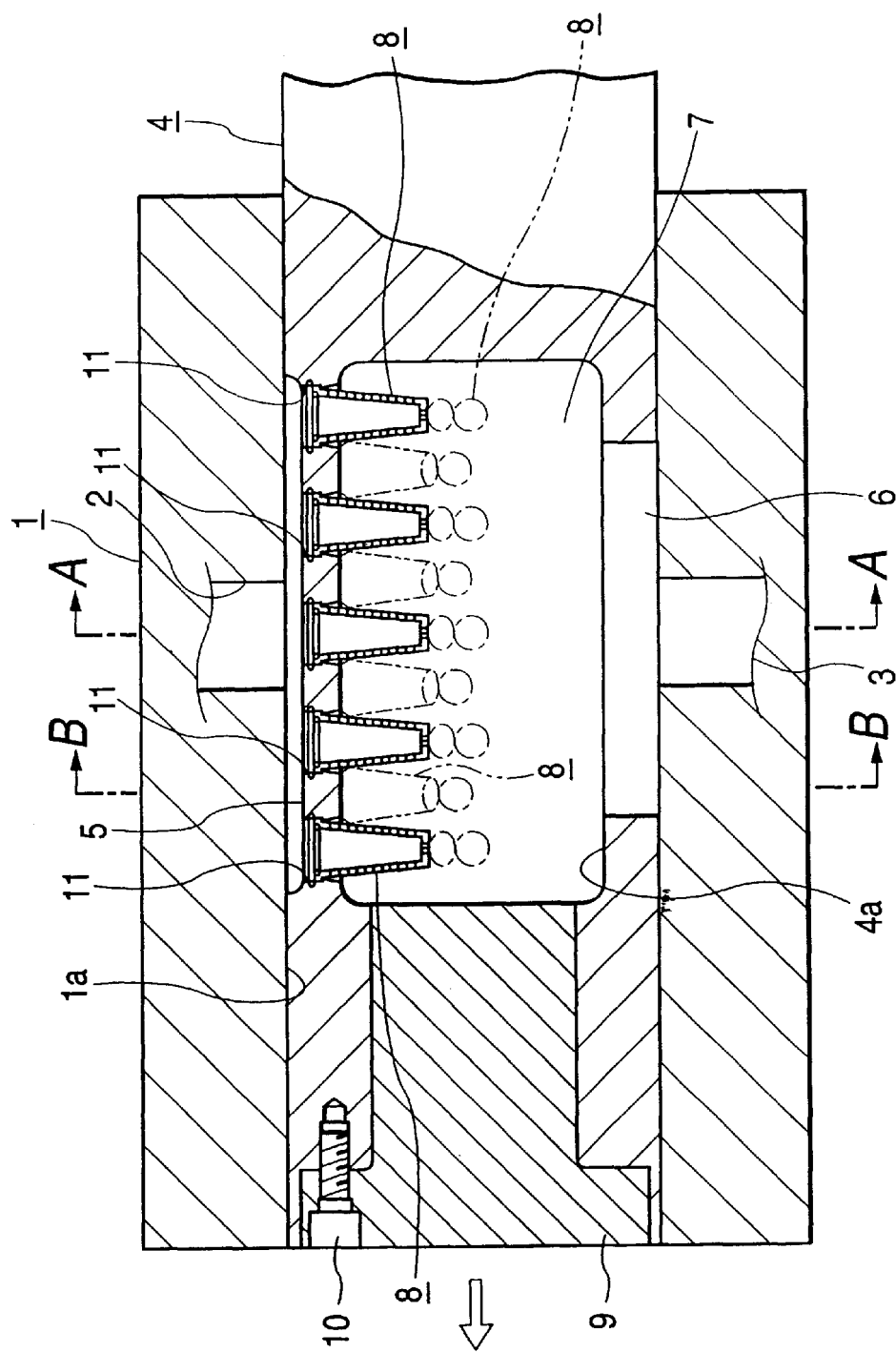
FIG. 1 is a schematic sectional view showing an essential part of the screen exchanging device according to one embodiment of the present invention.

The screen exchanging device according to one embodiment of the present invention will be described referring to the drawings.

Figure 2:
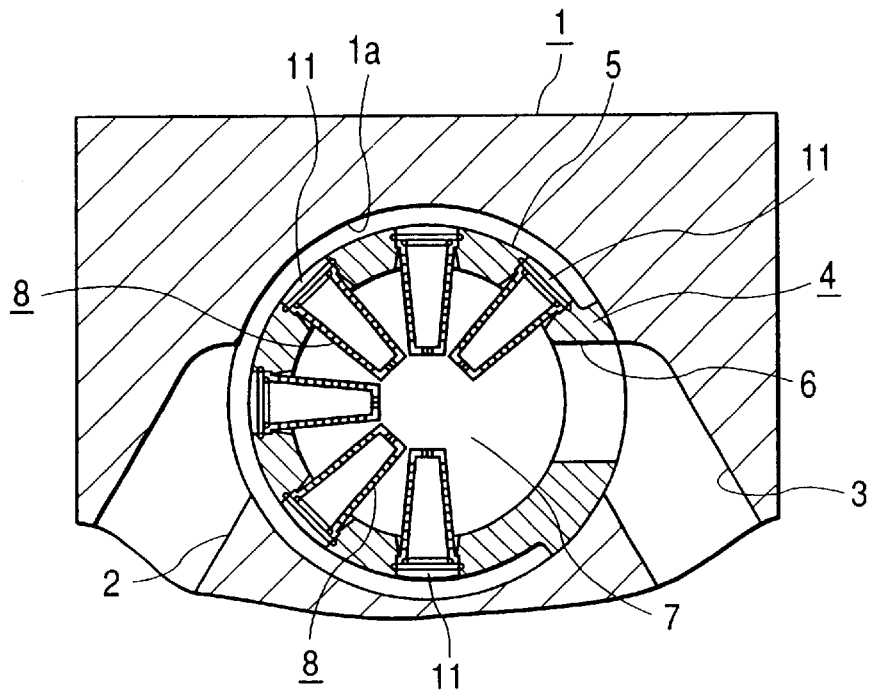
FIG. 2 is a schematic view partly in section taken along a line A—A in FIG. 1.
Figure 3:
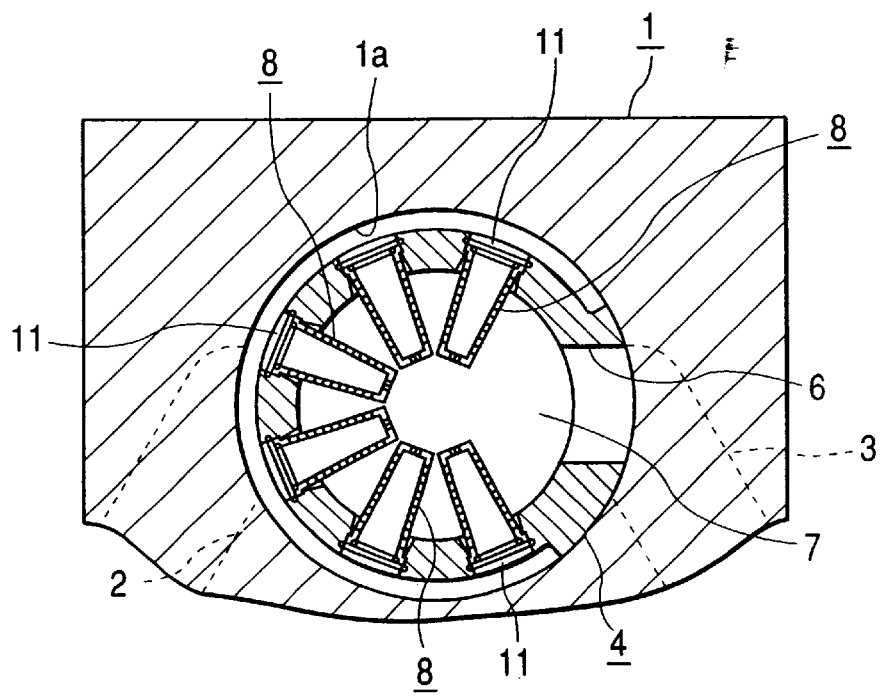
FIG. 3 is a schematic view partly in section taken along a line B—B in FIG. 1.

As shown in FIGS. 1 to 3, a housing 1 has a through hole 1a in which a slide bar 4 is axially slidably inserted. At a distal end of the slide bar 4 is formed in an axial direction a deep hole 4a which is open at the distal end face of the slide bar. An open mouth of the hole 4a is closed with a detachable plug body 9 fixed by means of a bolt 10 or the like to form a cylindrical filter chamber 7. One of the opposite side walls of the housing 1 is provided with an inlet 2 through which the molten resin flows in, while the other side wall is provided with an outlet 3 through which the molten resin flows out.

In the cylindrical filter chamber 7 in the slide bar 4 is formed a communicating hole 6 in a form of an elongated bore or a round bore, etc. extending in an axial direction at a position corresponding to the outlet 3 of the housing 1. An interior of the filter chamber 7 communicates with the outlet 3 through the communicating hole 6. A concave 5 having a constant depth is formed in a wide range on an outer peripheral wall of the cylindrical filter chamber 7 except an area adjacent to the communicating hole 6. The concave 5 communicates with the inlet 2 of the housing 1 at almost the middle portion thereof.

In the concave 5 are formed a plurality of fitting holes 11 which extend from the peripheral wall toward an axis core of the filter chamber 7 and are spaced in both circumferential and axial directions with respect to one another. A screen cartridge 8 is detachably inserted into each of the fitting holes 11 as described below.

A larger number of the fitting holes 11 can be provided in case where they are arranged in an axially staggered relation.

Figure 4:
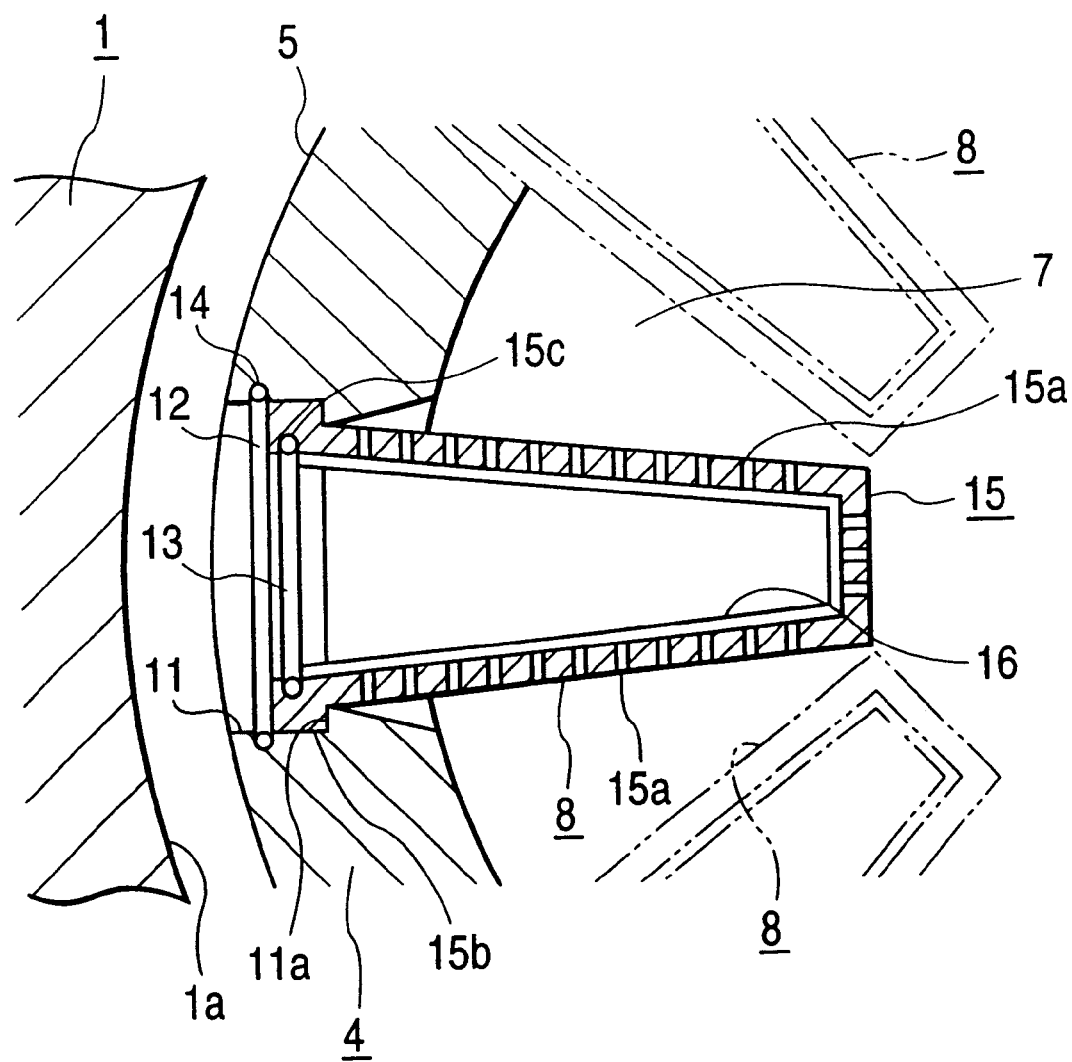
FIG. 4 is a schematic enlarged view of a part of FIG. 2.

As shown in FIG. 4, the screen cartridge 8 includes a breaker plate 15 of a perforated plate in a form of a bottomed conical tube which decreases in diameter from its open end toward a bottom end, and a net member 16 in a form of a bottomed conical tube which decreases in diameter from its open end toward a bottom end.

In this embodiment, the breaker plate 15 in a form of a bottomed conical tube has a flange portion 15b projecting from an outer circumferential edge of its open end. An entire area except the flange portion 15b is in a form of a perforated plate having a plurality of perforations 15a which are spaced with respect to one another and extend through the breaker plate from an outer peripheral face toward an inner peripheral face thereof. At an inner peripheral face of the flange portion 15b is formed a groove 15c into which a smaller holding ring 13 is fitted.

With the described arrangement, the breaker plate 15 can be detachably fitted by inserting it into each of the fitting holes 11 formed in the concave 5 of the slide bar 4, in a state where a rear face of each the flange portion 15b abuts to a projection 11a formed at an inner peripheral face of the fitting hole 11, and then engaging a larger holding ring 12 in a groove 14 formed at the inner peripheral face of the fitting hole 11. When the larger holding ring 12 is removed, the breaker plate 15 can be easily extracted from the fitting hole 11. The net member 16 in a form of a bottomed conical tube inserted into the breaker plate 15 can be detachably fitted by engaging the smaller holding ring 13 in the groove 15c formed at the inner peripheral face of the breaker plate 15, and can be easily extracted from the breaker plate 15 by removing the smaller holding ring 13.

In this embodiment, the molten resin which has entered through the inlet 2 flows into each of the screen cartridges 8 by way of a flat passage constituted by a gap between an inner peripheral face of the through hole 1a of the housing 1 and the outer peripheral face of the concave 5 of the slide bar 4. After the foreign objects are filtered through the net member 16, the molten resin flows into the filter chamber 7 and then flows out through the outlet 3 by way of the communicating hole 6.

When the filtered foreign objects have been accumulated inside the net member 16 with a lapse of the filtering time and the pressure loss has become over the determined value, the screen cartridge 8 will be exchanged. On this occasion, the slide bar 4 is linearly translated in a direction of a hollow arrow in FIG. 1 by means of linear actuating means such as a hydraulic cylinder or the like which is not shown, in order to project the whole filter chamber 7 from the one end of the through hole 1a of the housing 1. Then, removing the larger holding ring 12, the screen cartridge 8 is extracted from each the fitting hole 11. A new screen cartridge 8 which has been prepared beforehand is then inserted into the fitting hole 11 and the larger holding ring 12 is engaged in the groove 14 to fix the new screen cartridge 8. After finishing this exchanging operation of the screen cartridge 8, the slide bar 4 is returned to the position as shown in FIG. 1 by linearly moving it in a direction opposite to the hollow arrow in the drawing.

Because the net member 16 is detachably inserted in the breaker plate 15 in this embodiment, it is possible to exchange only the net member 16 with a new one.

Now, the screen exchanging device according to another embodiment will be described.

Figure 5:
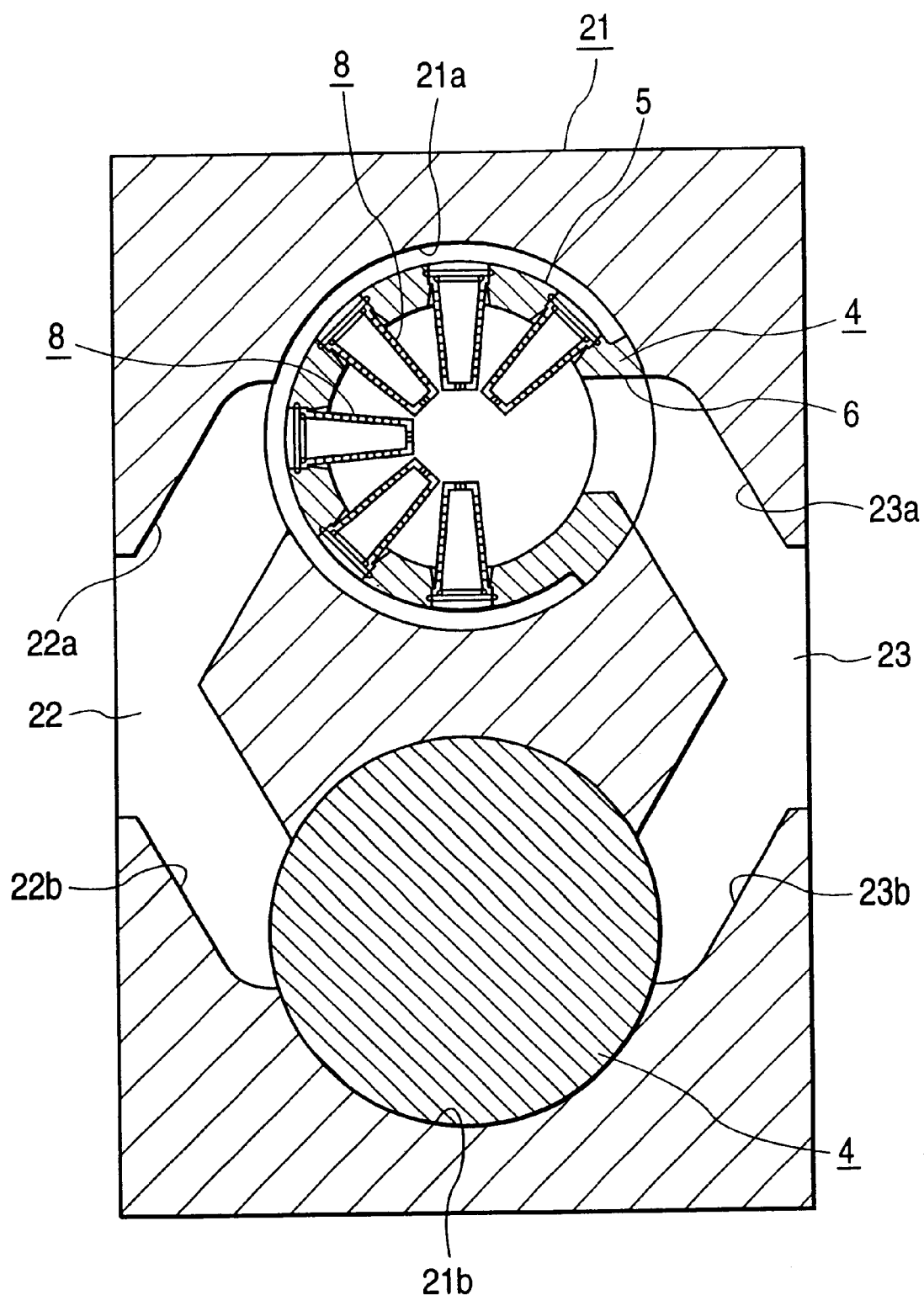
FIG. 5 is a schematic sectional view showing an essential part of the screen exchanging device according to another embodiment of the present invention.
Figure 6A:
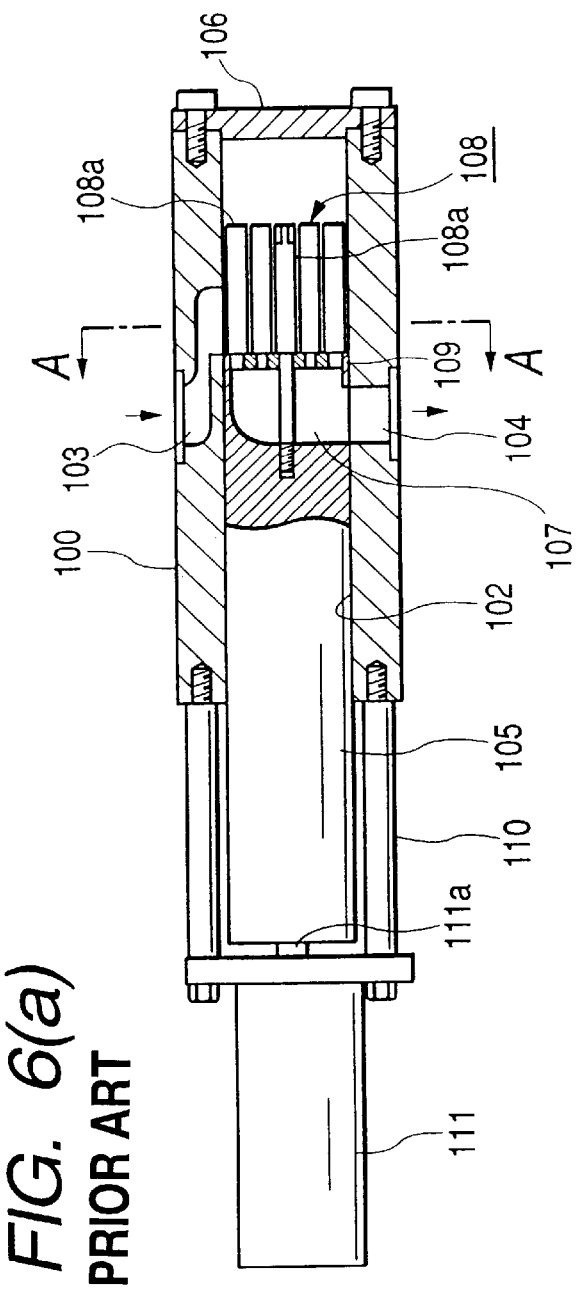
FIGS. 6(a) and 6(b) illustrate one example of the conventional screen exchanging device in which (a) is a schematic plan view showing the essential part partly in section, and (b) is a schematic sectional view taken along a line A—A in (a).
Figure 6B:
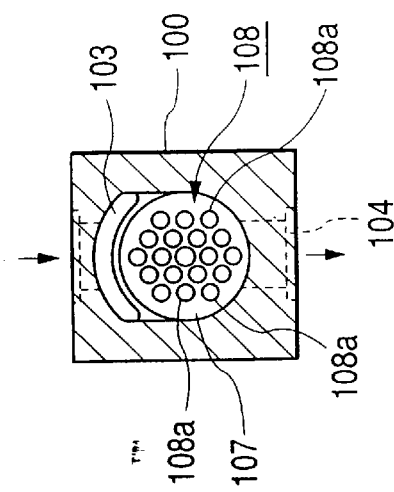

As shown in FIG. 5, the screen exchanging device according to this embodiment includes a housing 21 provided with two through holes 21a, 21b which are formed therein in parallel, an inlet 22 bifurcated in two branch inlets 22a, 22b, one of the branch inlet 22a communicating with one of the through holes 21a and the other branch inlet 22b communicating with the other through hole 21b, and an outlet 23 bifurcated in two branch outlets 23a, 23b, one of the branch outlet 23a communicating with one of the through holes 21a and the other branch outlet 23b communicating with the other through hole 21b. In each of the through holes 21a, 21b is axially slidably inserted a slide bar 4 which is similar to the one illustrated in FIGS. 1 to 4.

With respect to other components than described above, the screen exchanging device in this embodiment is similar to the one described referring to FIGS. 1 to 4, and therefore, denoting them with the same reference numerals, a further explanation will be omitted.

According to the mode in this embodiment, by allowing the slide bars 4 axially slidably inserted in both the through holes 21a, 21b to alternately project from the through holes 21a, 21b, the exchanging operation of the screen cartridges 8 can be conducted alternately.

It is needless to say that the screen cartridge may not necessarily include the breaker plate 15 of the type in which the net member 16 is detachably inserted as described above, but it can be changed to a breaker plate integrally provided with a net member.

As being constructed as described above, this invention achieves the following effects:

Because a larger number of the screen cartridges can be provided ensuring a larger filtering area, the pressure loss will be greatly reduced as compared with the conventional device.

Further, because the exchanging work of the screen cartridges can be rapidly performed saving time and efforts, availability rate of the machine will be remarkably increased.

What is claimed is:

1. A screen exchanging device comprising:
   a housing having a through hole;
   a slide bar axially slidably inserted in said through hole;
   a cylindrical filter chamber formed in a distal end of said slide bar;
   an inlet and an outlet provided in opposite side walls of said housing respectively, a molten resin which has entered through said inlet being filtered in said filter chamber and flows out through said outlet;
   a hole provided in said slide bar and communicating with said outlet;
   a concave portion formed at an outer peripheral face of said slide bar except at an area adjacent to said hole, wherein said hole and said concave portion communicate with said cylindrical filter chamber;
   a plurality of fitting holes extending from said concave portion toward an axis core of said filter chamber and spaced in circumferential and axial directions with respect to one another; and
   a plurality of screen cartridges detachably fitted respectively into said fitting holes, each of said screen cartridges having a perforated breaker tube, and a tube shaped net member inserted into said perforated breaker tube.

2. A screen exchanging device as claimed in claim 1, wherein said net member is detachably inserted into said breaker tube.

3. A screen exchanging device comprising:

a housing having an axial through hole, side walls of said housing respectively provided with an inlet and an outlet; and a slide bar slidably inserted into said through hole, said slide bar provided with a cylindrical filter chamber and an intermediate hole that communicates with said outlet, an outer peripheral face of said slide bar provided with a concave portion except at an area adjacent to said intermediate hole;

wherein said slide bar is provided with a plurality of fitting holes that extend from said concave portion toward an axis core of said filter chamber and spaced in circumferential and axial directions with respect to one another; and wherein a plurality of screen cartridges are detachably fitted respectively into said fitting holes, each of said screen cartridges having (1) a perforated breaker tube, and (2) a tube shaped net member inserted into said perforated breaker tube.

4. A screen exchanging device as claimed in claim 3, wherein said net member is detachably inserted into said breaker tube.

* * * * *